United States Patent Office 3,363,489
Patented Jan. 16, 1968

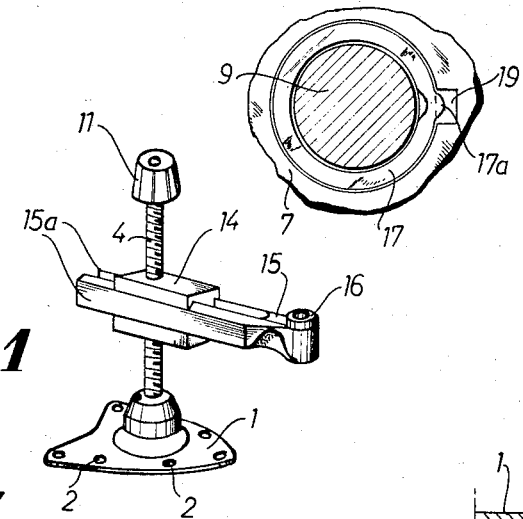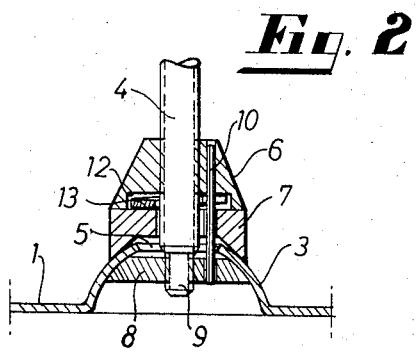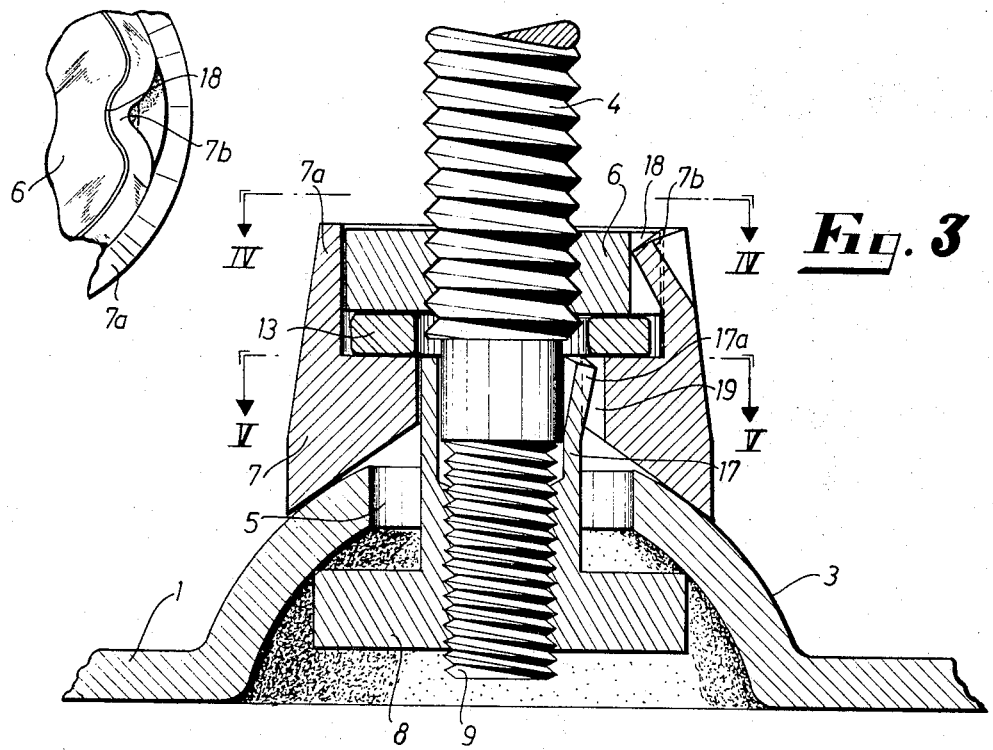

3,363,489
JIGS FOR DRILLING OF PARALLEL HOLES
Björn Harald Hedén, 3. D Stenbrogatan,
Mölndal, Sweden
Filed Dec. 28, 1965, Ser. No. 516,884
Claims priority, application Sweden, Jan. 2, 1965, 6/65
5 Claims. (Cl. 77—62)

The present invention relates to drill jigs for use in the drilling of a number of holes in parallel with one another. More specifically, the invention relates to the kind of drill jigs which comprise a base, a shaft extending therefrom with a swivel connection to said base at one end, means for locking said shaft to said base in any of the positions of inclination with respect to the base that are made possible by said swivel connection, and means carried by and displaceable along said shaft for supporting a drill guide which is also adjustable towards and away from said shaft in a direction at right angles thereto.

The main object of the present invention is to provide a novel drill jig of the kind set forth above which is reliable in operation and easy to use, and wherein the position of the drill guide may be easily and accurately adjusted.

It is also an object of the present invention to provide easily operated means for positively locking the shaft in any desired inclination relative to the support.

A further object of the invention is to provide means for securely supporting the drill guide while at the same time providing a maximum amount of adjustment of the position of the drill guide with respect to the shaft.

In the drill jig according to the invention, the base comprises a plate having a spherically curved portion and an opening therein for receiving said shaft end. The means for locking the shaft in any inclined position relative to the base comprises clamping means provided on said shaft end for acting on opposite faces of said curved portion of the base plate and includes a first nut on an inner threaded portion of said shaft, a second nut on an outer threaded portion of said shaft having a different pitch from that of said inner threaded portion, and means whereby said nuts may move towards and away from one another but are secured against rotation relative to one another.

In one embodiment of the invention the drill guide is provided at one end of an arm displaceable in longitudinal direction with respect to said supporting means which is in the form of a block in threaded engagement with said shaft.

In a preferred form of the invention embodying the above-mentioned drill guide arm and supporting block, said arm is bifurcated with the branches thereof having dovetailed cross section and being longitudinally displaceable in correspondingly shaped guide grooves in opposite sides of said block.

Further objects and characteristics of the present invention will appear from the following detailed specification with reference to the attached drawing, wherein:

FIGURE 1 is a perspective side view showing a drill jig according to one embodiment of the invention FIGURE 2 is a partial cross section through the lower portion of the drill jig shown in FIG. 1 and drawn to a larger scale, FIGURE 3 is a cross-sectional view corresponding to that of FIG. 2 and showing a second embodiment of the invention drawn to a still larger scale, FIG. 4 shows a portion of the jig in FIG. 3 seen from the line IV—IV in FIG. 3, and FIGURE 5 is a partial cross section along the line V—V in FIG. 3.

The embodiments shown in the drawing relate to drill jigs for use in dental work. Such a jig is of small physical dimensions and the principles of the present invention are especially useful in connection with such equipment. It should be understood, however, that this special kind of drill jig has been chosen here as an example only and that the invention is in no way restricted to drill jigs for dental work.

The drill jig shown in FIGS. 1 and 2 comprises a base plate 1 provided with a number of holes 2 for receiving any suitable kind of attachment means for securing the base plate to a support (not shown) on which the jig is to be mounted during a drilling operation. The base plate 1 is provided with a dome-like central portion 3 with a substantially spherical curvature. A screwthreaded shaft or spindle 4 has one end portion inserted through a circular opening 5 in the top of the spherically curved portion 3, said opening having a diameter considerably larger than the diameter of said shaft. In threaded engagement with the shaft 4 is a nut 6 between which and the spherical portion 3 there is provided a washer 7 having a conical end surface portion lying against the spherical portion 3. A second nut 8 is disposed within the spherical or dome-like portion 3 and is in threaded engagement with a reduced outer diameter portion 9 of the shaft 4. The threads on the end portion 9 have a different pitch than the threads on the remainder of the shaft 4. The nuts 6 and 8 are secured against rotation relative to one another by means of a pin 10 which is inserted in aligned through-bores in the nuts and extends through the washer 7 and the opening 5 in the spherical portion 3 of the base plate.

As a result of the different pitch in the threading of the end portion 9 and the threading of the remaining or inner portion of the shaft 4, rotation of the shaft in one direction or the other will cause a relative movement of the nuts 6 and 8 towards or away from one another, respectively. When the shaft is rotated in such a direction that the relative movement between the nuts is in the direction towards one another, the curved portion 3 of the base plate will be clamped between the washer 7 and the nut 8 as illustrated in FIGURE 2, so that the shaft will be locked in its position relative to the base plate. By rotating the shaft 4 in the opposite direction the nuts 6 and 8 are moved away from one another, so that the curved portion 3 will no longer be clamped between the washer 7 and the nut 8. The arrangement then serves as a swivel connection for the shaft 4, so that the latter may be adjusted to various inclined positions with respect to the base plate 1. For rotating the shaft 4 there is provided a knob 11 on the end of the shaft opposite to the end portion 9.

By using screw threads with only a slight difference in pitch for the two threaded portions of the shaft 4, a very small torque on the shaft will be sufficient for causing the curved portion 3 of the base plate to be subjected to a considerable clamping force by the nuts. The different threads may be of the same or opposite direction. The two threaded portions may for instance both have left hand threads with the outer portion 9 having the smaller pitch, so that the clamping movement of the nuts will be effected by a right hand twist of the knob 11.

In the side of the nut 6 facing the washer 7 there is provided a circular recess 12 which houses a spring washer 13 acting between the nut 6 and the washer 7 for the purpose of providing a yielding force keeping the washer 7 and the nut 8 pressed against opposite sides of the curved portion 3 also when the latter is not positively clamped between the washer 7 and nut 8 due to the nuts 6 and 8 having been moved towards one another by rotation of the shaft 4. By virtue of this arrangement, the connection of the shaft 4 to the base plate 1 will not become slack when the shaft is not positively locked, but instead the friction of the washer 7 and the nut 8 against the opposite surfaces of the curved portion 3 caused by the spring washer 13 will be sufficient to maintain the shaft 4 in any position and will allow easy adjustment of such position. This frictional engagement of washer 7 and nut 8 with corresponding surfaces of the curved portion 3 caused by the spring washer 13 will also prevent the nuts 6 and 8 from rotating with the shaft when this is rotated for moving the nuts axially to clamping position.

In FIGURE 1, numeral 14 indicates a parallelepipedic block carried by the shaft 4 which extends through and is in threaded engagement with a threaded bore extending through the block. The block 14 is elongated in a direction perpendicular to the shaft 4 and the through-bore for the shaft is provided near one end of the block, so that the block extends a larger distance from the shaft in one direction than in the opposite. The block 14 serves as a support for an arm 15 which extends perpendicularly to the shaft 4 and is provided at the end remote from the shaft with a flanged drill guide bushing 16 removably inserted in a bore extending through the arm in a direction substantially parallel to the shaft 4. The arm 15 is bifurcated and the parallel legs or branches 15a thereof have dovetailed cross sections and are displaceably guided in correspondingly shaped guide channels in opposite sides of the block 14. The location of the drill guide bushing with respect to the shaft 4 may thus be adjusted by pushing the arm towards the shaft or drawing it away therefrom. The distance of the guide bushing from the support on which the base plates 1 is mounted is adjusted by rotating the guide block 14 around the shaft 4, thereby displacing the block on the threads of the shaft towards one end or the other of the shaft. When the shaft 4 is locked in position with respect to the base plate 1 as described above, all holes drilled by means of a drill inserted through the guide bushing 16 in various positions of the guide bushing with respect to the shaft 4 and the support will be exactly parallel with one another.

Since the guide channels in the guide block 14 receiving the branches 15a of the arm 15 extend the whole length of the block and are open at both ends, the branches 15a may be inserted in the guide channels from any end of the block. This is of special advantage when the guide block is asymmetrically arranged with respect to the shaft 4, as in FIGURE 1, so that one end of the guide block extends farther out from the shaft 4 than the opposite end. To ensure that the arm 15 is firmly supported by the block 14 the branches 15a should at all times be embraced by the total length of the guide channels in the block 14. Thus, when the branches 15a of the arm 15 are inserted into the guide channels from the "longer" end of the guide block as shown in FIGURE 1, the arm 15 may be pulled in a direction away from the shaft 4 until the rear ends of the branches 15a register with the rear ends of the guide channels. In order to place the guide bushing 16 at the shortest possible distance from the shaft 4, the branches 15a of the arm 15 are completely drawn out of the guide channels in the block 14 and are inserted from the opposite or "shorter" end of the guide block. With the branches 15a inserted into the guide channels from this end of the block the arm 15 may not be drawn out in a direction from the shaft 4 the same distance as in the first case, but may be pushed a longer distance towards the shaft 4 placing the guide bushing 16 close to the shaft.

The embodiment shown in FIGURES 3, 4 and 5 differs from the above-described embodiment only by way of certain modifications in the lockable swivel attachment of the shaft 4 to the base plate 1. The same reference numerals are used in FIGURES 3–5 as in FIGURES 1 and 2 for corresponding parts. In the modified embodiment the washer 7 has an upwardly directed skirt 7a surrounding the spring washer 13 and the nut 6, and the nut 8 on the outer end portion 9 of the shaft 4 is made in one piece or connected with a sleeve portion 17 extending through the opening 5 in the spherical portion 3 and having its end portions opposite to the nut 8 disposed within the opening of the washer 7. The nut 6 is provided at its outer periphery with an axially extending groove 18 into which a portion 7b of the skirt 7a has been pressed so as to secure the nut 6 and washer 7 against rotation relative to one another while permitting relative movement in axial direction. In a similar manner the nut 8 is secured against rotation relative to the washer 7 by means of an outwardly pressed portion 17a of sleeve 17 which engages an axial groove 19 in the inner wall of the washer 7. These means for securing the two nuts 6 and 8 against relative rotation replace the pin 10 in the embodiment of FIGURE 2. Apart from this change the embodiment of FIGURES 3–5 is essentially similar to that of FIGURE 2 and operates in the same manner.

The invention is not limited to the embodiments hereinbefore described and shown in the drawing as examples only. Various modifications are conceivable within the scope of the appended claims.

What I claim is:

1. A jig for drilling holes in parallel with one another and comprising a base, a shaft having a swivel connection to said base at one end, means for locking said shaft to said base, means carried by and displaceable along said shaft for supporting a drill guide, and means for adjusting the position of said drill guide with respect to said shaft in a direction at right angles thereto, characterised in that said base comprises a plate having a spherically curved portion and an opening centrally in said portion for receiving said shaft end which is provided with releasable clamping means acting on opposite faces of said curved portion and comprising a first nut on an inner threaded portion of said shaft, a second nut on an outer threaded portion of said shaft, said threaded portions having different pitch, and means securing said nuts against rotation relative to one another.

2. A jig as claimed in claim 1, characterised in that said drill guide is provided at one end of an arm displaceable in longitudinal direction with respect to said supporting means which is in the form of a block in threaded engagement with said shaft.

3. A jig as claimed in claim 2, characterised in that said arm is bifurcated with the branches thereof having dovetailed cross section and being longitudinally displaceable in correspondingly shaped guide grooves in opposite sides of said block.

4. A jig as claimed in claim 3, characterised in that said block is elongate in the direction of said guide grooves and has a through-bore through which said shaft extends, said through bore being disposed towards one end of said block.

5. A jig as claimed in claim 2, characterised in that said drill guide comprises an interchangeable bushing detachably inserted in a bore extending through said arm.

References Cited

UNITED STATES PATENTS 2,434,320   1/1948   Karlstrom _____ 32—67